(12) United States Patent
Thomas, III et al.

(10) Patent No.: US 11,590,726 B2
(45) Date of Patent: Feb. 28, 2023

(54) SURFACES WITH EMBEDDED INFORMATION

(71) Applicant: Hewlett-Packard Development Company, L.P., Spring, TX (US)

(72) Inventors: Fred Charles Thomas, III, Fort Collins, CO (US); Derek Lukasik, Fort Collins, CO (US); Guy Adams, Bristol (GB)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 153 days.

(21) Appl. No.: 16/756,149

(22) PCT Filed: Jan. 24, 2018

(86) PCT No.: PCT/US2018/014959
§ 371 (c)(1),
(2) Date: Apr. 15, 2020

(87) PCT Pub. No.: WO2019/147227
PCT Pub. Date: Aug. 1, 2019

(65) Prior Publication Data
US 2021/0187895 A1  Jun. 24, 2021

(51) Int. Cl.
*B32B 3/02* (2006.01)
*G06F 3/03* (2006.01)
*B42D 25/305* (2014.01)
*G06F 21/84* (2013.01)
*G09B 11/00* (2006.01)

(52) U.S. Cl.
CPC ............. *B32B 3/02* (2013.01); *G06F 3/0317* (2013.01); *B42D 25/305* (2014.10); *G06F 21/84* (2013.01); *G09B 11/00* (2013.01)

(58) Field of Classification Search
CPC ......... B32B 3/02; G06F 3/0317; G06F 21/84; B42D 25/305; G09B 11/00
See application file for complete search history.

(56) References Cited

U.S. PATENT DOCUMENTS

| | | |
|---|---|---|
| 5,051,736 A | 9/1991 | Bennett et al. |
| 6,879,701 B1 | 4/2005 | Rhoads |
| 7,113,615 B2 | 9/2006 | Rhoads et al. |
| 7,374,087 B1 | 5/2008 | Edgecomb |
| 9,129,171 B2 | 9/2015 | Ishigami |
| 9,327,542 B2 | 5/2016 | Kecht et al. |
| 9,718,296 B2 | 8/2017 | Rodriguez |
| 2004/0095337 A1 | 5/2004 | Pettersson et al. |
| 2007/0097100 A1 | 5/2007 | Marggraff et al. |
| 2010/0001962 A1 | 1/2010 | Doray et al. |
| 2011/0216091 A1 | 9/2011 | Song et al. |
| 2017/0239973 A1 | 8/2017 | Baker et al. |

FOREIGN PATENT DOCUMENTS

| | | |
|---|---|---|
| GB | 2422467 | 7/2006 |
| GB | 2518286 | 3/2015 |

*Primary Examiner* — Gustavo Polo
(74) *Attorney, Agent, or Firm* — Knobbe, Martens, Olson & Bear, LLP

(57) ABSTRACT

A surface including: a plurality of visually detectable marks, wherein the visually detectable marks include: a first group of grid marks forming a grid and a second group of information marks encoding information based on positions of information marks of the second group of marks relative to the data page, wherein grid marks are less than 45% of the visually detectable marks on the surface.

20 Claims, 6 Drawing Sheets

SURFACES WITH EMBEDDED INFORMATION

BACKGROUND

People learn to use pens and/or pencils for writing, drawing, creating documents, etc. as part of their education. Electronic devices have struggled to compete with the simplicity, reliability, and cost of a pen and paper.

Writing systems with surfaces containing embedded information provide features not found in other systems. For example, watermarks have been used to identify the source of a document. Similarly, embedded information in currency surfaces and substrates helps prevent counterfeiting. In some cases, the embedded information is readily accessible to a user. In other cases, the embedded information uses specialized equipment to detect.

Some writing surfaces include marks to aid their use. Children learn to write using paper ruled with three-line patterns to aid in forming letters of the proper proportions. Engineering paper includes grids to aid in drawing shapes.

BRIEF DESCRIPTION OF THE DRAWINGS

The accompanying drawings illustrate various examples of the principles described herein and are a part of the specification. The illustrated examples do not limit the scope of the claims.

Figure 1A:
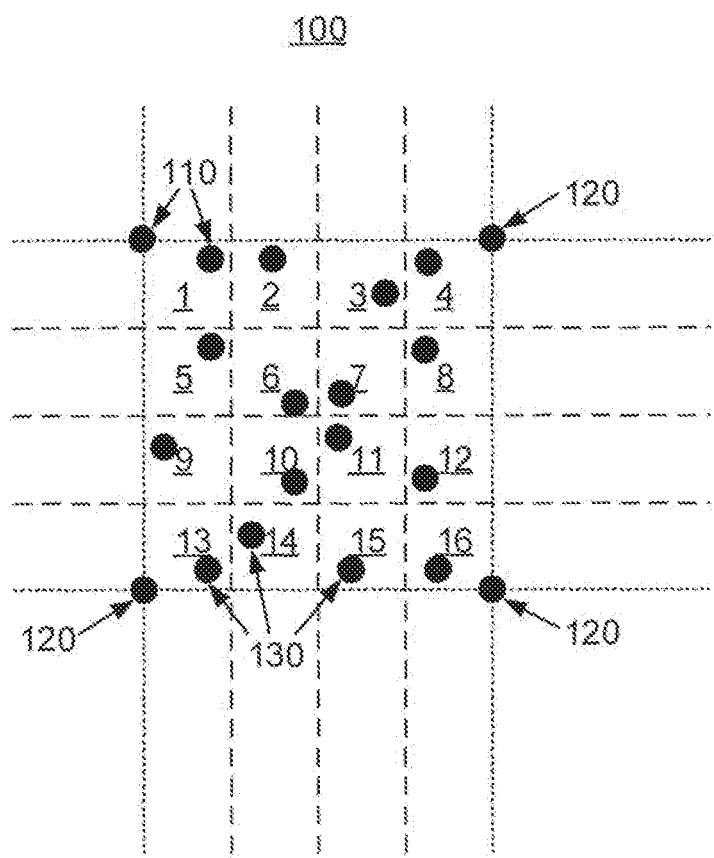
FIG. 1A shows a surface with embedded information according to one example consistent with the present disclosure.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

This specification describes surfaces containing positionally embedded information. Embedding information in a surface may be used to provide a variety of benefits. The embedded information may include document information, page information, error correction, and/or location on the page information. Page here may refer to a physical sheet of media and/or an electronic display, for example, a tablet, a smartphone, and/or a desktop display. The electronic display may display coordinates of the display screen. The electronic display may display the coordinates of the portion of the document being displayed on the relevant part of the screen. The embedded information may include security features, watermarks, encrypted information, and/or decryption keys for information. In an example, the information includes a web location and a password to access a digitally stored copy of a physical document. The information may include decryption keys and/or other security features. In an example, the embedded information includes a user identification and/or the user account used to access and/or print the associated document.

The surface may be printed media, for example, paper printed with an available inkjet and/or similar low resolution printer. The surface may be media printed with other printing processes, especially those capable of higher resolutions. The surface may be an overlay. An overlay is a layer of material that is put over and/or under another layer, for example, under a surface of an electronic display. An overlay may be added afterwards to a display of an electronic device, for example, as a polymer film. An overlay may be applied to a drawing surface, a mouse pad, a desktop, and/or other non-display surface. The overlay may be produced using offset and/or other higher resolution printing technique allowing higher densities of information to be embedded and/or encoded in the surface. The longer use life of the overlay compared to a printed document may support dedicated higher printing costs. The surface may be a display using the pixels of the display. For example, a surface may encode the relative position of a displayed document in an area of the display and/or an absolute position relative to the display itself. The amount of information that can be embedded per mark facilitates a wide variety of uses.

One challenge with a stylus which does not use a surface embedded sensor and/or similar method to locate the position of the stylus tip, is compensating for the angle of the stylus relative to the surface and the rotation of the stylus relative to the surface (or vice versa) such as to compensate for any positional perspective distortion such changes in orientation relative to the stylus and surface have. These relative orientations between stylus and surface are changing dynamically during a scribing session. It may be useful to take an acquired image and compensate for the angle and/or rotation before extracting embedded information.

For example, a larger field of view provides coverage of a greater portion of the surface being assessed. A larger field of view produced either increased pixel size with corresponding loss of resolution and/or increased matrix size which increases the processor load to process the image(s).

Similarly, increasing the processing power in the stylus produces an increase in cost, energy use, size for the stylus, weight of the stylus, etc. Increased energy use may result in greater power storage, shorter supported session times, increased stylus weight, and/or larger stylus diameter.

The surface includes a pattern which is used to embed and/or encode information. The surfaced pattern may be formed by marks. In an example, the marks are dots. The marks may have a circular shape. The marks may have a roughly square shape. In an example, the marks are formed by an X by Y set of droplets from a printing system. For example, the mark may be a 2×2 figure formed by four droplets from an inkjet printer. The marks may be marks with the same size in the X and Y axes. Smaller marks may be used with a system which does not encode information into the shape of the mark; instead the system determines the presence and/or absence of a mark at a location relative to a reference grid. The use of asymmetrical marks, e.g., 2×4 and 4×2 may encode more information per mark but may also use larger marks to reliably extract the information embedded in the mark. Further, larger marks may be more noticeable and/or distracting on the surface compared with a similar density of markings separated from each other. Shape based information in the marks may render the marks more vulnerable to jet failures, defects, and/or dead pixels in a surface. In contrast, a 2×2 and/or 3×3 square and/or circular marks includes redundancy and robustness compared with single droplet and/or single pixel marks.

Finally, the system may use a set of 2×3 marks and/or similar where individual marks are treated with marks (i.e., conveying binary present/absent information) but the overall orientation of the marks is used to provide orientation information. For example, all the marks may be oriented in a major axis in X and a minor axis in Y (e.g., a 2×3 droplets and/or 2×3 pixels mark). The marks may be oriented to point to the nearest grid mark. A system may include a check for secondary encoding in the mark.

Letters, symbols, characters, etc. may encode information by the relative positions of the dark regions to each other, forming their characteristic shape. Information can also be conveyed by the position of the symbol relative to another. Hence in "1.0" and "10." the relative positions of the 1 and 0 relative to the period conveys information about the power of the value represented. In an encoding scheme, instead of using symbols such as 1 and 0, the information is embedded partially and/or completely based on position of the marks. As mentioned above, this reduces the resolution to assess the marks and allows the use of smaller marks.

Like the other tradeoffs, inclusion of more marks in a given area has consequences. More marks may result in a darker surface. More marks may result in less spacing between marks. Accordingly, it may be useful to limit the number of marks in an area of the surface to a single mark. It may be useful to limit the number of marks in an area of the surface to two marks. It may be useful to limit the number of marks in an area to certain one and two mark permutations, for example, prohibiting marks from being in adjacent portions of the space.

Some encoding patterns include control information. In an example, control information is a rectangular grid, with a control mark at regular intervals of X and Y. The intervals in X and Y may be equal such that the grid is a square grid. The intervals in X and Y may be unequal such that the grid is a rectangular grid, e.g., 4×5 units such that the spacing in X and Y provides orientation information.

In this specification and the associated claims, the area surrounded by four grid marks (without any grid marks internal to that space) is called a data page. A data page contains an array of data grids. For example, a data page may contain a 5×5 array of data grids. Each data grid contains: no encoding marks, a single encoding mark; multiple encoding marks; an orientation mark; or multiple orientation marks. Orientation marks and/or grid marks may also be located at the edges and/or corners of the data grids. That is to say, interstitial placement between adjacent data grids.

As used in this specification and the associated claims, a surface is a non-uniform structure that is accessible from the environment on at least one side. A surface may be a sheet of paper. A surface may be a curved plastic body. A surface may be a screen where the non-uniformity is provided by differences in absorbance of material which is not physically exposed to the environment but still visible from the environment. A surface may be physically non-uniform and/or have a variety of states in a similar physical structure. A surface may be formed during additive manufacture of a component.

As used in this specification and the associated claims, visually detectable marks include marks that are detectable with the use of a camera and/or using magnification in addition to marks detectable with the unaided eye. In many examples, the marks are quite small and difficult to see with an unaided eye. A good choice in some implementations may be rendered marks with materials (inks, etc.) that are invisible to the human eye while visible to the camera. Indeed, minimizing the visual impact of the marks is a benefit of using fewer grid marks and more information providing marks.

Minimizing the visual impact of the marks may also be achieved by making the marks visible under ultraviolet (UV) and/or infrared (IR) light in addition to and/or instead of visible light. Infrared light is lower energy, can be produced readily with a light emitting diode (LED) and doesn't present the same health risks as UV, making IR a good choice for some implementations. The use of black toner and/or ink deposited using a printer avoids having to stock a specialized material for making the visually detectable marks. Specialty inks which are designed to have high contrast and/or visibility to a camera in a selected irradiance band, such as the previously mentioned UV and/or IR irradiance bands, are a good choice for some implementations. Finally, elements of printed material that may be difficult to see on their own, such as uncolored polymers (e.g., latex) may be readily visible using a camera capable of detecting wavelengths outside the visible spectrum.

Among other examples, this specification describes a surface with embedded information including: a plurality of visually detectable marks, wherein the visually detectable marks include: a first group of grid marks forming a grid and a second group of information marks encoding information based on positions of marks of a second group of information marks relative to the grid, wherein grid marks are less than 45% of the visually detectable marks on the surface.

Among other examples, this specification also describes a surface with embedded information including: a plurality of visually detectable marks, wherein the visually detectable marks include: a first group of grid marks forming a grid; a second group of information marks encoding information based on positions of the information marks in the second group of information marks relative to the grid; and a third group of orientation marks in each data page of the grid, wherein the third group of orientation marks provide orientation information for the grid.

This specification also describes a surface with embedded information including: a surface with embedded information comprising: a plurality of visually detectable marks, wherein the visually detectable marks include: a first group of composite marks, the first group of composite marks forming a data page and the first group of composite marks indicating an orientation direction for the visually detectable marks on the surface, and a second group of information marks, wherein each data page contains an array of data grids, one data grid in each data page contains a composite mark, other data grids in each data page contain an information mark, and the information marks encode information based on the position of the information mark within the respective data grid containing the information mark.

Turning now to the claims, FIG. 1A shows a surface with embedded information according to one example consistent with the present disclosure. The surface (100) includes: a plurality of visually detectable marks (110), wherein the visually detectable marks (110) include: a first group of grid marks (120) forming a grid and a second group of information marks (130) encoding information based on positions of marks of the second group of marks (130) relative to the grid, wherein the grid marks (120) are less than 45% of the visually detectable marks (110) on the surface. The dotted lines of FIG. 1A show the alignment provided by the grid marks (120). The dashed lines of FIG. 1A define the data grids (1-16)

The numbers 1-16 in FIG. 1A show the data grids (1-16) of a data page. The data grids may each contain an information mark (130). The position of the information mark (130) in the respective data grid indicates the value for that date grid (1-16). In this example, the data grids (1-16) are in the data page defined by the four shown grid marks (120). The data grids (1-16) form a 4×4 array in the data page.

Other patterns of data grids (1-16) are possible, including other square patterns, e.g., 3×3, 5×5, 6×6. Rectangular patterns may also be created, for example, 3×5, 2×7, 5×4, etc. More complex patterns, such as tessellated data grids may also be used.

The grid marks (120) may be fewer than 45% of all the marks (110) on the surface (100). Each grid mark (120), in the four corners, supports four adjacent data pages, except for data pages on an edge of the marking area of the surface. Accordingly, for interior data pages, there is one grid mark (120) per data page. In the 4×4 array of data grids (1-16) of the data page shown in FIG. 1A, there are 16 information marks (130) for encoding information per data page Accordingly, the grid marks (120) are 1 out of 17 marks or just under 6% of the marks (110) on the surface (100). Of course, more grid marks (120) may be used to define the grid. For example, a grid mark (120) may be placed at each corner of the data page and half way between the respective corner grid marks (120). However, even doubling and/or tripling the number of grid marks (120) leaves the number of marks below a 45% threshold.

In an example, the grid marks (120) are less than 20% of the visually detectable marks (110) on the surface (100). The grid marks (120) may be less than 5% of the visually detectable marks (110) on the surface (100), for example, by using a 5×5 data page with 25 information marks (130) per grid mark (120). With larger arrays of data grids, the grid marks (120) may be a progressively smaller percentage of the total marks (110) on the surface (100). In an example, each mark (110) of the plurality of visually detectable marks (110) is a member of group one or group two but not both.

In theory, the marks (110) may be made arbitrarily small and the information encoding density on a surface (100) could be made correspondingly high. However, there are practical limitations to be considered. First, smaller marks (110) will impact the minimum resolution of the system used to detect and/or resolve the marks (110). Second, smaller marks (110) may use specialized equipment to produce. Third, smaller marks (110) may be more vulnerable to contamination issues, e.g., smudges, dust, etc. being mistaken for marks (100). Fourth, smaller marks (110) may be more vulnerable to production defects, such as an occluded nozzle, dead pixels, and/or engraving errors. In an example, keeping the marks (110) and the spacing between marks to a mean size increment of 84.67 microns, with the incremental size of a standard 300 marks-per-inch print head, allows the marks to be produced using printing equipment available in current office environments. Industry standards for print head and/or print plate mastering for various print processes support 300 marks-per-inch on the low end of resolution and have increment resolutions doubling the marks-per-inch, e.g., 300, 600, 1200, 2400, and 4800 . . . marks-per-inch. The ability to produce the information embedded surface (100) using widely available inkjet printers reduces the cost to produce the surface (100) and allow the benefits to be widely incorporated into everyday activities. In contrast, the use of higher resolutions, e.g., 600 marks-per-inch and/or 1200 marks-per-inch, may increase the information density in the surface (100) but may also use more expensive equipment and/or specialized equipment. While dots-per-inch (dpi) on printers have noticeably increased over the last few decades, the continued benefits of higher dpi outputs are less compelling for everyday office use due to the acceptability of current resolutions for most office activities. Accordingly, having a surface (100) that can be produced with an inkjet printer using mark sizes of roughly 150 and/or 300 marks-per-inch provides practical benefits for adoption and usage. In an example, a 300 dot-per-inch printer is used to produce 2 droplet by 2 droplet marks (110) for a 150 marks-per-inch mark (110) size.

Decreasing the area of the surface (100) occupied by the marks (110) may reduce the visual impact of the pattern. In an example, using 300 marks-per-inch marks (110), the marks (110) cover no more than 4.5% of the surface (100). In an example, using 300 marks-per-inch marks (110), the marks (110) cover no more than 1.5% of the surface. Using 300 marks-per-inch marks may cover no more than 8%, 6%, and/or 2% of the surface (100).

The marks (110) may have a width and a length that are equal, the width and length being perpendicular to each other. The marks (110) may have asymmetry in the length and width. The use of different sizes and shapes may allow more information to be embedded per mark (110) but also changes the resolution to resolve the mark (110) and its shape information. Using a circular and/or squares mark (110) with equal X and Y dimensions allows marks (110) to be detected and information resolved based on the presence or absence of the mark (110). In an example, the mark (110) may be formed by four droplets from an inkjet printer deposited in a 2×2 pattern. The marks (110) may also be 2×2, 3×3, 2×3, 3×2, 2×4, etc. patterns.

The use of a smaller percentage of the surface (100) occupied by marks (110) may make the marks (110) less noticeable on the surface (100). However, there is still the tradeoff with sensitivity of the pattern to dead pixels, etc. which should be considered when designing marks (110). In an example, the marks (110) are sized to be robust to the loss a pixel, droplet, and/or other element from the anticipated production methods. The marks (110) may be sized to be robust to the loss of up to 50% of the pixels and/or droplets forming the mark (110).

The described embedded surface (100) may function with a stylus and/or similar instrument which includes multiple cameras. The use of multiple cameras acquiring different images of a common portion of the surface (100) reduces the benefit of dense grid marks (120) in compensating for the angle and/or rotation of the stylus. Instead, the fixed relationship between the multiple cameras can be used to compensate for angle and/or rotation of the stylus. This allows the use of fewer grid marks (120), for example, by including multiple data grids (1-16) in each data page of the surface (100).

A system with stereo cameras also may have the ability to make measurements of the image once tilt has been corrected. Because the distance from the cameras to the surface (100) may be determined using the stereo images, a true position rather than a relative size measurement may be made, in contrast, single cameras do not distinguish between different sized objects with the same proportions at different depths. The ability to make non-relative measurements can be used for a variety of purposes, for example, to determine an encoding pattern based on grid size, to determine the size of the marks (110), determining when the tip of a stylus is contacting the surface (100), etc.

Further, such a stylus and/or system may be backward compatible with surfaces (100) with encoding patterns that use the higher percentages of grid dots (120). A system, for example, a stylus, may detect the type of pattern by the ratio of grid marks (120) to information marks (130), in an example, the system may identify the grid marks (120), count the number of information marks (130) in a data page and use that information to identify the encoding pattern used. For example, a system may use a first encoding pattern with a 5×5 data grid (1-25) array per data page and a second encoding pattern with a 4×4 data grid (1-16) array per data page. Counting the number of marks (110) is a relatively rapid method to determine the encoding pattern used. Counting the marks (110) does not use dedicated marks to identify the encoding pattern. Similarly, determining a mark (110) density and/or coverage percentage may be used to identify an encoding system for the information marks (130).

Figure 1B:
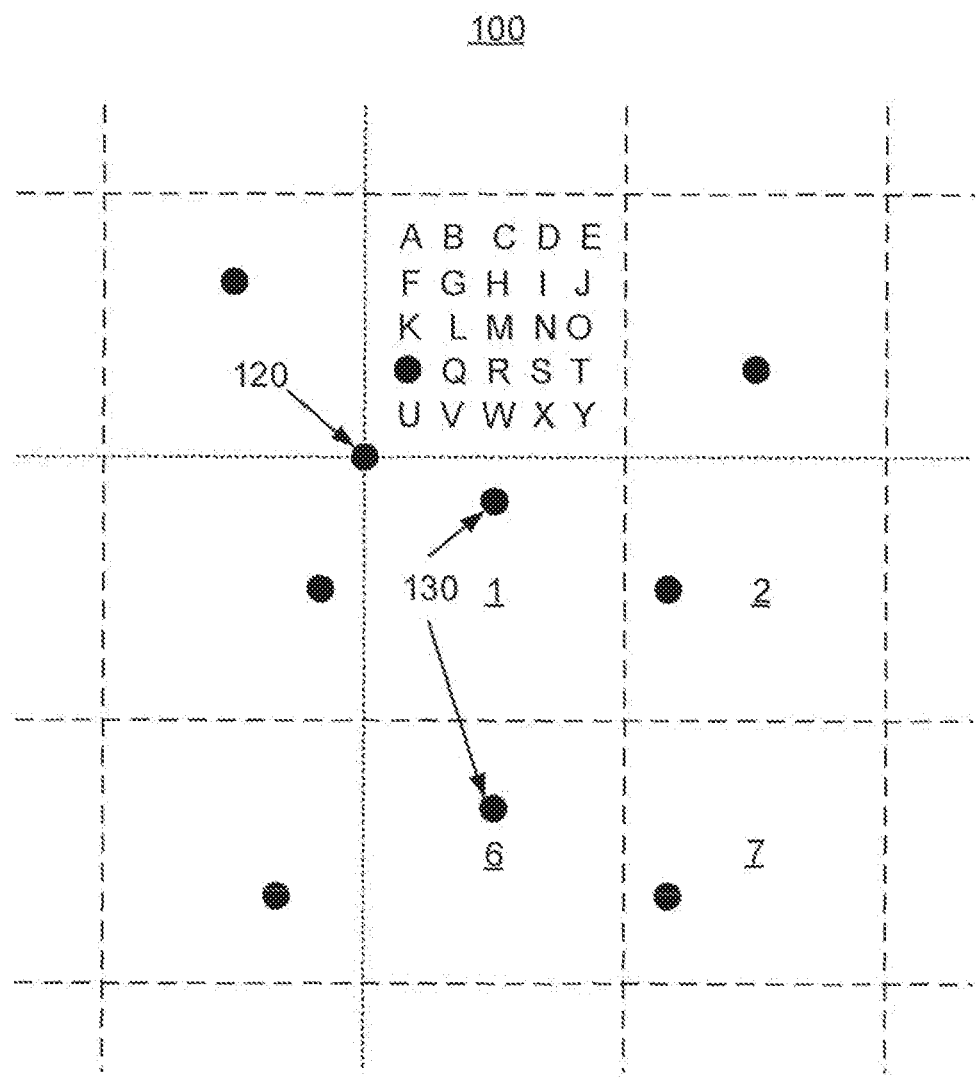
FIG. 1B shows a higher magnification view of a portion of the surface shown in FIG. 1A.

FIG. 1B shows a higher magnification view of a portion of the surface (100) shown in FIG. 1A. In the upper left of FIG. 18, a grid mark (120) is present. A number of data grids (1-16) containing information marks (130) are shown. The letters show examples for positions for information marks (130) in the data grids (1-16). In FIG. 18, up to 26 states can be represented using a single encoding mark (130) and/or no encoding marks (130), 25 states from encoding mark (130) positions, and one state more from no encoding marks (130). While FIG. 18 shows a 5×5 array of placement locations in the data grid (1-16), other encoding position patterns can be utilized. For example, the array of encoding positions may be larger, e.g. 6×6, or smaller e.g. 2×2, 3×3, and/or 4×4. The array could be non-square, for example, the array may be rectangular, e.g. 3×4 and/or 5×3. The array may use offset columns with different numbers of rows, for example, consider a five column array with 4 rows, 5 rows, 4 rows, 5 rows, and 4 rows respectively. This loses 3 states compared to the 5×5 array but staggering the rows between columns, for example, such at every column is shifted by half a row relative to the adjacent columns increases the center to center distance between marking locations. Increasing the separations may enhance the ability to resolve mark and/or avoid ambiguity, especially when the mark pattern is reconstructed to compensate for angle and rotational distortions.

In an example, each data grid (1-16) provides at least 5 states for a single information mark (130) located in the data grid (1-16). As seen in FIG. 18, the number of states may be higher, for example 6, 8, 9, 12, 15, 16, 20, 25, 26, 35, 36, etc. Other values may be used as well depending on the particular array of locations used in the data grid and the decision to use the blank state as an information state vs. a null state. It may be beneficial to reserve a state for non-information purposes. It may be helpful to use states and/or data grids (1-16) to support error correction/detection and/or parity operations. Additional states can be achieved by the use of two information mark (130) and three information mark (130) patterns in data grids (1-16). In an example, all two information mark (130) combinations are allowed. In another example, restricting two information mark (130) patterns to patterns where the two information marks (130) are not horizontally and/or vertically adjacent are allowed. Another approach is to prohibit two information mark (130) patterns which have diagonal, vertical, and/or horizontal adjacent information marks (130). Similarly, three and/or more information mark (130) patterns may be allowed, either with and/or without exclusion of adjacent information marks (130). However, the tradeoff to the increased information density achieved with more information marks (130) is the increased coverage of the surface (100) by marks (110), the decreased transparency of a screen using multiple information marks (130) per data grid (1-16), and/or the increased challenges in resolving adjacent marks (110), especially in more challenging stylus orientations and rates of travel. On the other hand, the use of two information marks (130) in a data grid (1-16) provides n*(n−1) additional states over single information mark (130) data grids which may increase the information density, where n is the number of positions in a data grid (1-16). For example, a data grid (1-16) as shown in FIG. 1B would have 25×24 possible states with two information marks (120)+25 single information mark (120) states+1 no information mark (120) state for a total of 626 states. This allows a large amount of information to be stored in a single data page, for example, a single data page data page as shown in FIGS. 1A and 18 can contain the number of states in a single data grid raised to the number of data grids in the data page.

Each information mark (130) encodes a state based on the position of the information mark (130) relative to a grid defined by grid marks (110). As discussed below, composite marks may also be used to define the grid. There can be any number of states for an information mark (130). In practice, very large data grids which contain a large number of states store less data than multiple smaller data grids which occupy the same area. In part, this is because the number of states increases linearly with the area of the data grid, but increasing the number of data grids increases the value exponentially. The total number of states is the number of states per data grid raised to the number of grids. So a set of 3 data grids with 5×5 states in each has $25^3$ possible states, using a single information mark (130) per data grid. On the other hand, going to very small data grids, such as straight binary encoding and/or 2×2 grids can produce mark (110) densities that are visually distracting and/or obstruct too much of the surface. The surfaces (100) described in this specification balance the information density per the amount of the surface occupied by the marks (110).

In a first example, where marks (110) are limited to a single mark (110) per data grid or no mark (110), a null-state, and the states encoded within the data grid are provided by a 3×3 position array with state locations spaced at 300 dpi increments (84.67 um) both horizontally and vertically, for a total of 10 possible states in each date grid. The 300 dpi spacing allows for easy positional replication of these encoded marks (110) using widely available print devices which may scale up from 300 dpi resolutions at the lower end in a doubling manner. For example, office print devices such as inkjet and/or laser jet, as well as commercial print presses may offer printer resolutions of 300, 600, 1200, 2400, 4800, 9600 and/or dpi etc. While these resolutions are widely used in industry; the present disclosure is not limited to any particular mark resolution. However, as information density is related to mark resolution and/or size, information density may use information about mark (110) areas or dimensions to allow comparison.

One way to describe encoded states is in terms of data capacity and as an equivalent number of bits. A bit is the exponential value of the number of levels or states that may be encoded by the exponential power of 2. For example, 4 states may be encoded by 2 bits (e.g., $2^2=4$), 8 states may be encoded by 3 bits (e.g., $2^3=8$), and 8192 states may be encoded by 13 bits (e.g., $2^{13}=8192$). In a 10 encoded state example, there are 3.32 bits of data (e.g. $2^{3.32}=10$) per data grid. A data page of a 5×5 array of such 3×3 data grids has a data capacity of 3.32 bits to the 25th exponential power or 83 bits. This provides $9.67\times10^{24}$ or 9.67 yotta total states which may be encoded in such a data page.

As previously described, the number of first group grid marks (120) associated with an individual data page, in some examples, may be one when contiguous data pages share use of the corner gird marks (120). The 3×3 previously described data grid arrays, for this example, may be spaced at 508 µm or at 6 incremental 300 dpi spaces apart in both the vertical and horizontal directions. At this resolution, the 5×5 data page has a size of 2.54 mm×2.54 mm or 0.1"×0.1". With this geometry, the areal density of this example, including both first and second Group marks, is 12.36 bits/mm². This amount of areal density relates to the size of the marks (110) used to encode the pattern and what the relative overall occlusion density of the set of marks used is. This metric for the patterned surface is identified as Areal Density Low-Occlusion Factor.

An example of how to calculate Areal Density Low-Occlusion Factor is provided here to demonstrate how to determine this metric. It is useful to have an encoded surface pattern that has a high data areal density (bits/mm²) while at the same time occluding as little of the surface area as possible with the marks (110) used for encoding and/or data extraction, i.e., reading, the surface (100). For example, reading may be performed using a dynamically re-orientating sensor based stylus. The encoded patterned is intended to 1) provide a large amount of data in an area of a data capture sensor's plane-of-view on the surface, while limiting the amount of surface occupied by marks (110) visible to the user of the sensor/stylus. These surface marks (110) may be less visible to the human user and hence less distracting when the average and/or nominal size of the marks (110) is reduced. Reducing the mark (110) size reduces the occlusion of the pattern. However, there are also minimum limits to the average and/or nominal size of the marks (110) based on available technology, especially when looking at a low-cost implementation as a commercial product. For example, a printer with 300 dpi resolution has a dot size nominally of 84.3 µm. To detect and/or image a mark (110) of this size, the sensor and/or camera may use an imager resolution of half this dimension, assuming sufficient contrast to provide a detectable signal-to-noise for the pattern. Accordingly, as mark printing capabilities increase resolution and associated camera and/or other sensor technologies for the describe electronic stylus increase resolution, smaller marks (110) may be used and higher information densities achieved. Thus, this specification describes information densities in context of the average size of marks (110) used. The metric of Areal Density Low-Occlusion Factor is also calculated in the context of a specific mark size and/or area. In contrast, the benefit of the described approaches are independent of the size of the marks (110) used to encode the information.

For the example described above, i.e. 2.54×2.54 mm square data page encoded at 12.36 bits/mm², the Areal Density Low-Occlusion Factor using average/nominal 100 µm diameter circular marks (110) is calculated by taking 1) the areal density of 12.36 bits/mm² and dividing by 2) the percentage area that the pattern's total marks (110) occlude in the unit area. In this case, the 100 µm marks occlude 3.4% of the surface (100) area. Hence, the Areal Density Low-Occlusion Factor is 3.62 bits per percent occlusion, when the nominal mark (110) has an area of 0.00785 mm² (the area of a 100 µm circular mark). In another example, using a 300 dpi (84.6 µm) circular mark (110) the Areal Density Low-Occlusion Factor is 5.07 bits/mm² per % mark-occlusion. Smaller marks (110) reduce the occlusion percentage for a given mark to mark spacing.

Other examples provided herein will be described using circular marks (110) with 100 µm diameters. However, this is to allow ease of comparison and does not limit the scope of the material to marks (110) of this size and/or shape. Instead, it should be understood that benefits associated with the surface pattern in context with 100 µm diameter average nominal diameter marks extend to any size mark (110) that will produce a readable pattern. For example, as marks (110) get larger the marks (110) will overlap each other in the pattern. Another example of marks (110) being too large occurs when the dynamic translation rate (m/sec) of the sensor reading the marks (110) increases. The blur of captured images of the surface (100) may become the limiting maximum size consideration for marks (110). Hence, in a use case where the sensor translation rate is as high as 1 m/sec and the sensor minimum capture time is 100 µsec, the limit to the maximum dimension of the marks (110) may be ~139 µm.

In an example, the marks (110) have a mean spacing of not less than 350 microns and not greater than 3500 microns. The visually detectable marks (110) may encode at an Areal Density Low-Occlusion Factor of at least 2.75 bits/mm²/% mark-occlusion with an pattern of circular marks of no less than 100 µm diameter or marks having a per mark area no smaller than a per mark area of a 100 µm diameter circular mark.

In another example, the marks (110) are use a single mark per data grid and/or no mark (null-state), and the states encoded within the data grid are provided by a 4×4 position array with state locations spaced at 300 dpi increments (84.67 µm) both horizontally and vertically, for a total of 17 code states in each data grid. In this 17 encoded state example, there are have 4.09 bits of data per data grid, as 2^4.09 is 17. Such data grids may be formatted into a data page array of 5×5 data grids, which is a total of 25 cells (5×5=25), Such a data page has a data capacity of 4.09 bits to the $25^{th}$ exponential power or 102 bits. This provides 9.67×10^30 total states encoded in such a data page. Such a 5×5 data page of 4×4 data grids may have a size of 2.97 mm×2.97 mm using the 100 µm marks (110). This data page has an areal density, including both first (120) and second group (130) marks, of 11.16 bits/mm². The Areal Density Low-Occlusion Factor for this 5×5 data page of 4×4 data grids using 100 µm diameter circular marks is 4.46 bits/mm² per percent occlusion.

As calculated, the occlusion area of the Areal Density Low-Occlusion Factor is presumed independent of the material and/or ink used to form and/or print marks (110). For example, 100 µm diameter circular marks in the pattern would produce the same pattern occlusion regardless of whether the ink used were opaque to visible light and/or highly transparent, (e.g., 80% or more transparent), to visible light.

Using a smaller area for a data page may increase the amount of positional information being embedded in the surface (100). If each data page includes the position, then smaller data pages include more total locations but also more information recording those positions compared with larger data pages. However, these smaller data pages with position information may provide greater resolution of the position on the surface (100).

The information embedded in the information marks (130) may include parity bits and/or other error detection/correction. In an example, multiple parity bits are provided for each data page. These parity bit(s) may occupy grid mark/s and/or be located near the grid marks (120). As such, error correction parity marks are and/or can implicitly be included as part the data page address marks and/or the position of information marks (130). A parity bit(s) may be including with an orientation mark (described below).

Figure 2:
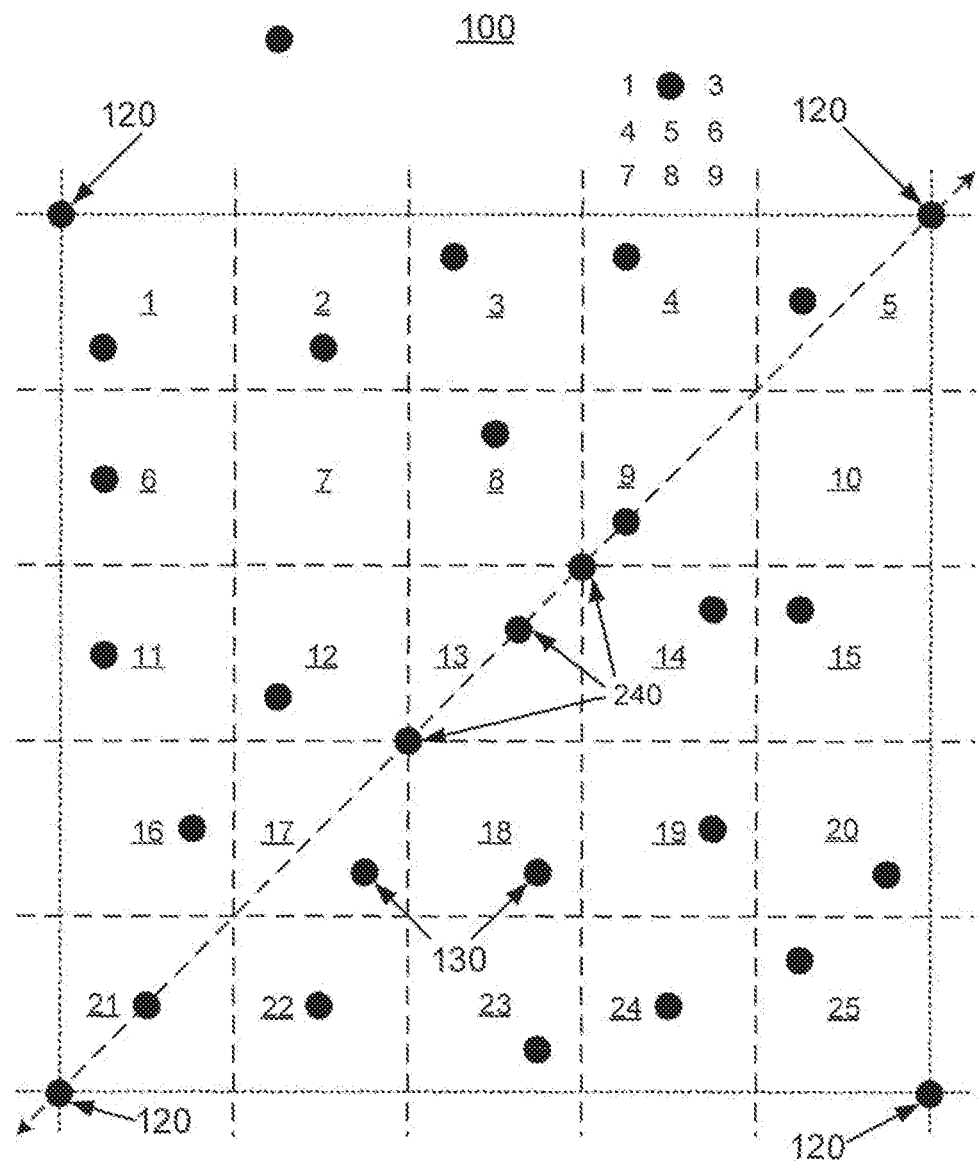
FIG. 2 shows an example of a surface with embedded information consistent with the present specification.

FIG. 2 shows an example of a surface (100) with embedded information consistent with the present specification. The surface (100) includes: a plurality of visually detectable marks (110), wherein the visually detectable marks (110) include: a first group of grid marks (120) forming a data page; a second group of information marks (130) encoding information based on positions of information marks (130) relative to the data page; and a third group of orientation marks (240) in each data page of the data page, wherein the orientation marks (240) provide orientation information for the data page.

FIG. 2 shows a 5×5 array of data grids (1-25). Twenty four of the data grids (1-24) contain information marks (130) containing information based on positions of the information marks (130) relative to the data page. One data grid (1-25) contains orientation marks (240). In this example, the data grid (1-25) containing the orientation marks (240) is located in the center data grid (13), however, other choices are possible, for example, the data grid (1-25) with the orientation marks (240) could be placed in one of the corners (e.g., data grids 1, 5, 21, and/or 25). Multiple data grids (1-25) may contain orientation marks (240).

One benefit of using the central data grid (13) for the orientation marks (240) is that the distances from an orientation mark (240) at the center of the central data grid (13) to each of the grid marks (120) are equal. Measuring these separations in an absolute separation rather than a relative scale provided by a single camera system provides an additional way to confirm the orientation marks (240). This provides secondary criteria to check the identity of the orientation marks (240). A variety of different patterns can be used to form the orientation marks (240). The orientation marks (240) may include spacing between the orientation marks (240) which cannot be produced by the grid marks (120) and/or the information marks (130). For example, the orientation marks (240) shown in FIG. 2 have a mark-to-mark separation which cannot be produced using the available positions for the grid marks (120) and/or the information marks (130). Further, the actual mark (110) to mark (110) separations which can be measured with a stereo camera system provides an efficient way to identify the orientation marks (240) on the surface (100). In an example, the mark-to-mark separation found in the orientation marks (240) is also the smallest separation between marks (110) on the surface (100). This can facilitate identification of the orientation marks (240) while the longer orientation mark (240) to grid mark (110) separations provide values that can be used to aid in compensating for rotation and scaling of a camera acquiring an image of the surface (100).

An orientation mark (240) may be placed on an edge between two data grids. An orientation mark (240) may be placed at a corner of four data grids. In an example, a pattern includes an orientation mark (240) in a data grid and two orientation marks (240) at corners of the data grid containing the orientation mark (240).

The third group of orientation marks (240) provides orientation information for the data page on the surface (240). Thus, the subgroup orientation marks (240) in a data grid (9) may form a figure which has no repetitive images when rotating the surface (100) 360 degrees. The orientation marks (240) may directly provide a direction, for example, the mark shown in FIG. 2 provides a direction aligned with the diagonal of the grid marks (120). This direction may continue to the respective center data grids (13) in diagonally adjacent data pages. This alignment allows the use of marks (110) further away, for example in a single camera field of view, to aid in establishing the data page for interpreting the information marks (130). Such further marks (110) are supplemental, but the longer distance may reduce the uncertainty of the orientation of the grid introduced by the size of the marks (110) and imperfect alignment between marks (110) and the pixels of the captured image. The use of more marks (110) which are aligned also allows averaging to reduce the uncertainty/error when constructing the data page.

Other secondary patterns in the embedded information can be similarly used to increase the accuracy of the reconstruction. In an example, this information facilitates identification and/or categorization of marks (110) based on their positions relative to an identified mark (110). For example, the existing relation between the grid marks (110) of the first group and the orientation marks (240) of the third group facilitates extraction of information from the information marks (130) in the surface (100).

In an example, extracting the information contained in the surface (100) may include: 1) acquire two overlapping images of the surface from two camera with a fixed physical relationship, 2) based on the differences in the overlapping portions of the two images, calculate the angle of the stylus containing the two cameras, 3) compensate for the angle of the stylus, to create a reconstructed image from a orthogonal orientation to the surface, and 4) determine the rotation of the reconstructed image. The method may include rotating the reconstructed image to put the data page in a standard orientation. All calculations may be performed in the rotated orientation. Similarly, all calculations may be performed in the angled, rotated orientation and extrapolated to answers. In practice, converting the image(s) to standard position and orientation may reduce the processing cost of subsequent analysis.

The figure formed by orientation marks (240) in a data page and/or a data grid (1-25) may include symmetrical features to provide an additional method of compensating for angle and/or rotation. However, because the orientation marks (240) forming the figure are in close proximity, the use of other more distant marks (110), may reduce error when correcting the acquired images to a standard orientation and/or rotation. In an example, the different distances, especially from the grid marks (120) and/or orientation marks (240) in adjacent data pages, are weighted based on their respective separations to compensate for the uncertainty introduced by pixilation and/or other noise sources in the image of the surface (100).

When a leading digit(s) of the information marks (130) are the same between adjacent data pages, the marks of the data grids (1-24) containing the leading digit(s) also provide a set of repeating marks (110) offset by the height and/or width of the data page. The leading digit information marks (130) can increase the number of relationships available to orient the image. Note that the value of the leading digit(s) need not be known in order to know to refine the orientation and the length of the offset, as long as the leading digit(s) are the same in both data pages. This value independence in reducing error in the data page orientation facilitates reconstruction of the data page and subsequent extraction of the values of the information marks (130).

One feature of the 3×3 array of positions within a data grid (1-24) is that, including the blank (no mark condition), each data grid is a base 10 digit. Further, the use of the blank (no mark condition) as the zero may reduce the number of leading zeros on the surface (100), further reducing the percentage of the surface (100) occupied by marks (110).

Leading digits tend to be disproportionately zero (which is why they are often excluded when writing numbers). Leading non-zero digits tend to be disproportionately distributed with 1 being the most common non-zero leading digit in count and/or cumulative type data. Accordingly, areas with blocks of repeated values, such as 1s and/or 2s, in the leading digit(s) may be used to provide the registration for the data page because the leading digit(s) may be not changing across the surface. For example, if the embedded information includes a document number, display model number, page number, and/or location; the document, display model number and page number may be the same for all data pages on the surface (and in the field of view). This pattern can be exploited to align the data page, reducing dependence on the grid marks (120). Row and/or column data may also be repeated in adjacent data pages. Row and/or column data may also vary in predictable ways allowing the row and/or column information marks (130) to be used for error detection, error reduction, and/or grid alignment.

Similarly, in a 5×5 data grid using a blank as an additional state, each data grid is a base 26 digit, which may correspond to an English letter. Other array sizes allow the inclusion of additional characters, cases, etc. This method of representing the position based on characters may allow the embedded information to be presented in a compact, an accessible format. Finally, states and/or data grids (1-25) may be used for parity and other error detection and/or correction.

In an example, each data page contains an array of data grids (1-25) and each data grid (1-25) contains a mark (110) from the second (130) and/or third (240) group of marks. All the orientation marks (240) in a data page may be located in a single data grid (1-25). e.g., a central data grid (13) and/or a corner data grid (1, 5, 21, 25). The orientation marks (240) in a data page may be located in multiple data grids (1-25).

The data grid (1-25) containing orientation marks (240) may be in the same array position in each of the data pages, i.e., each in the center data grid (13) and/or each a selected corner data grid (1, 5, 20, 24). This helps provide consistent distances and orientations between the orientation marks (240) and the grid marks (110).

The data grid (1-25) containing orientation marks (240) may be in different positions of the array of data grids (1-25) in different data pages. The position of the data grid (1-25) containing the orientation marks (240) may be used to provide an additional digit. For example, the data grid (9) containing the orientation marks (240) could provide a leading digit or a least-significant digit. For example, if the data grid (9) containing the orientation marks (240) was in the upper left corner of the array, the position of the orientation mark (240) containing data grid (9) could indicate a value of zero for the leading digit of the embedded information. In a 5×5 array of data grids (1-25), the placement of the data grid (1-25) with the orientation marks (240) in the center data grid (13) could indicate a value of 13. This approach reduces the storage capacity reduced due to not having information marks (130) in the data grid (1-25) containing orientation marks (240).

Figure 3:
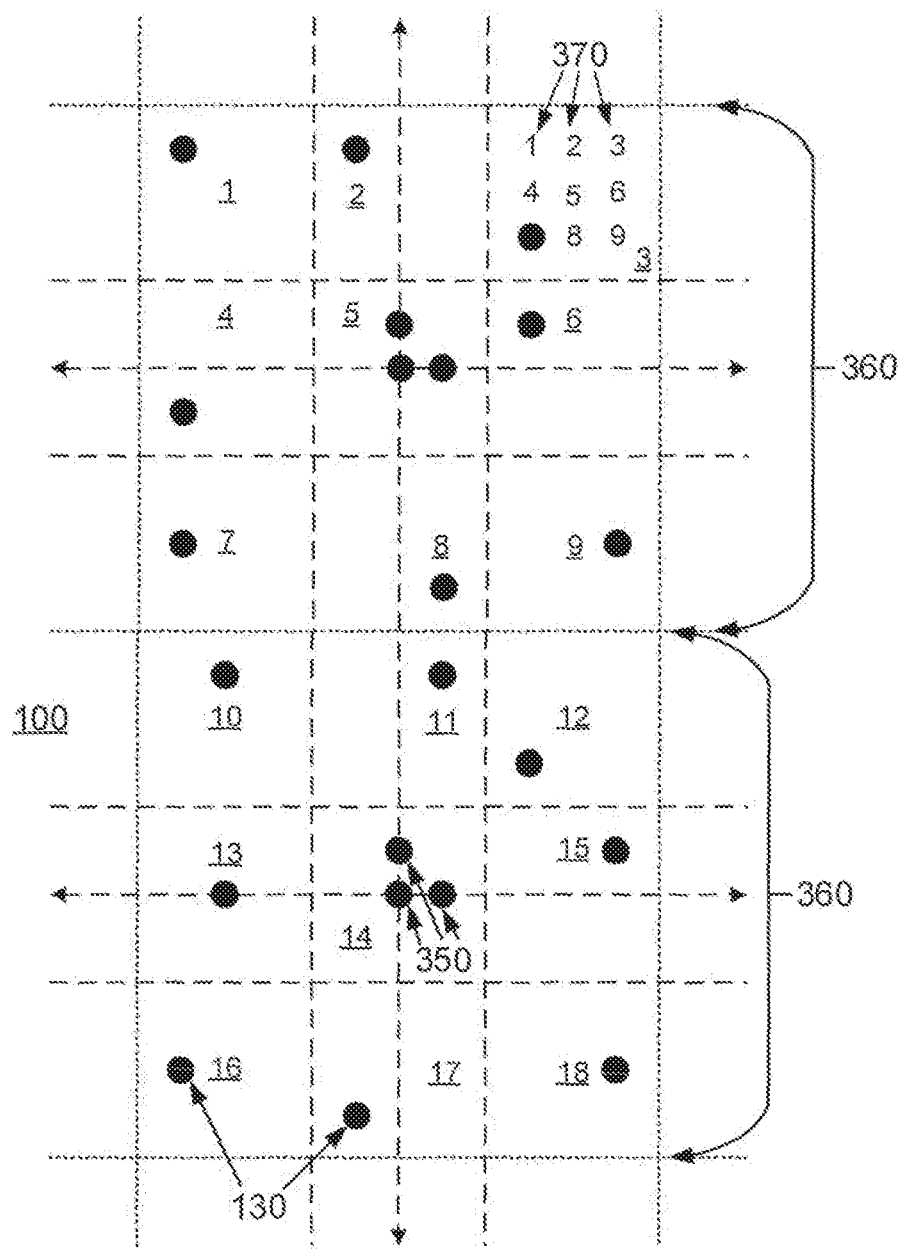
FIG. 3 shows a surface with embedded information according to an example consistent with the present specification.

FIG. 3 shows a surface (100) with embedded information according to an example consistent with the present specification. This specification describes a surface (100) with embedded information including: a plurality of visually detectable marks (110), wherein the visually detectable marks comprise: a first group of composite marks (350), the first group of composite marks (350) forming a data page and the first group of composite marks (350) indicating an orientation direction for the visually detectable marks (110) on the surface (100), and a second group of information marks (130), wherein each data page (360) contains an array of data grids (1-16), one date grid (1-16) in each data page (360) contains a composite mark (360), other data grids (1-16) in each data page (360) contain an information mark (130), and the information marks (130) encode information based on the position (370) of the information mark (130) within the respective data grid (1-16) containing the information mark (130).

For example, date grid 3 shows positions (370) of 1 to 6 and 8 to 9 with position 7 being occupied by the information mark (130). Thus, with this pattern, the information mark (130) would have a value of 7 in data grid 3. Other patterns may also be used, for example, adjacent values need not be in adjacent positions.

FIG. 3 integrates the grid marks (120) and the orientation marks (240) into the composite mark (350) which provides both functions. The composite marks (350) are in a fixed data grid (1-9) of each data page (360). This makes the X distances between subsets of composite marks (350) constant and equal to the width of the data page in the X direction. Similarly, the Y distances between subsets of composite marks (350) are constant and equal to the length of the data page in the Y direction. Each subset of composite marks (350) provides orientation information.

For example, the subset of composite marks (350) in FIG. 3 indicates the grid X and Y axes by the orientations of the shortest sides of the triangle formed by the between the composite marks (350) in the subgroup. In an example, the short sides of the triangle formed by the combination marks (350) are shorter than any potential combination of information marks (130). This allows a system to rapidly identify the composite marks (350) by looking for the marks (110) closest together.

The subgroups may be subgroups of three composite marks (350) per data page, the subgroups having the same relative positions and orientations in each data page on the surface. Use of two composite mark (350) subgroups creates two different potential orientations based on 180 degree rotation from each other. The use of repeating subgroups of composite marks (350) allows the image to use any sufficiently large portion of the surface (100) to definitively identify the data grids (1-18) and extract the embedded information. The orientation marks (350) may occupy more than one data grid (1-18) of a data page. The orientation marks (350) may form patterns that extend beyond a single data grid (1-18) in a data page. The orientation marks (350) may occupy interstitial area between the allowed positions for information marks (130).

FIGS. 4A-D show examples of orientation mark (240) and/or composite mark (350) patterns consistent with the present specification. Orientation marks (240) may be used with and/or without grid marks (120) defining the corners of the data pages.

Figure 4A:
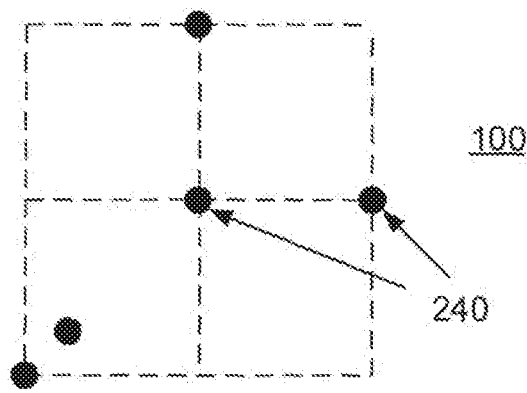
FIGS. 4A-D show examples of orientation mark patterns consistent with the present specification.

FIG. 4A extends outside of a data grid (1-16), placing orientation marks (240) on the intersections between adjacent data grids (1-16) to form a triangle with a tail of three closely spaced orientation marks (240). The three orientation marks (240) in a line include mark-to-mark separations and a ratio of the two mark-to-mark separations which are not produced by the expected encoding for other types of marks (120, 130) on the surface (100).

Figure 4B:
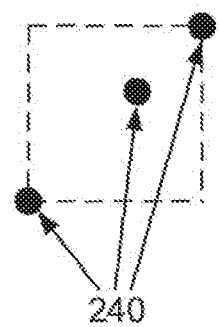

FIG. 4B dispenses with the triangular region while retaining the three orientation mark (240) tail. Again the spacing between the three orientation marks (240) may be found in the orientation marks (240). The spacing between the three orientation marks (240) may not be found in the grid marks (120) and/or information marks (130).

Figure 4C:
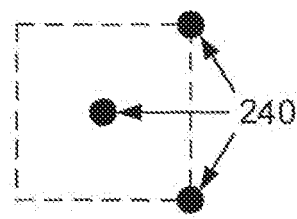

FIG. 4C shows an orientation mark (240) with a point in the center of the data grid (350) used for the orientation marks (240). The other two marks provide point toward the grid marks (120) defining the corners of the data page around the data page (340).

Figure 4D:
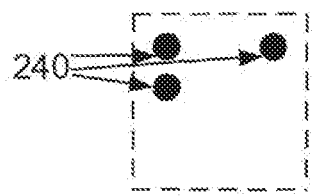

FIG. 4D has all the orientation marks (240) in a single data grid. The short side of the triangle formed by the orientation marks (240) cannot be formed by other marks (110) on the surface (100) if the encoding used excludes adjacent marks in multiple encoding marks (120) in a data grid (350) and/or limits the number of encoding marks (120) in an encoding date grid (350) to a single mark (120). A downside of using the closer spacing for these two orientation marks (240) a more noticeable concentration of marks (110). The small and middle length sides of the triangle formed by the orientation marks (240) in this example both correspond to the axes of the data page, allowing the data page to be reconstructed. Identifying orientation marks (240) in the adjacent data pages allows the use of longer line lengths to reconstruct the data page with greater signal (line length) to noise (mark position uncertainty).

Other examples of orientation marks (240) may be implemented based on the principles disclosed here. The orientation marks (240) may: indicate a unique orientation for the image, may be detected in the image using processor efficient approaches, and may readily be distinguished from information marks (130). The orientation marks (240) may be replaced with composite marks (350). Implementations using composite marks (350) may dispense with grid marks (120) and/or keep the grid marks (120) to increase robustness. Differing mark (110) geometry and/or shape (circle vs. square etc.) may also be used to distinguish between types of marks (110) and/or increase data encoding range to each date grid's information content.

Figure 5:
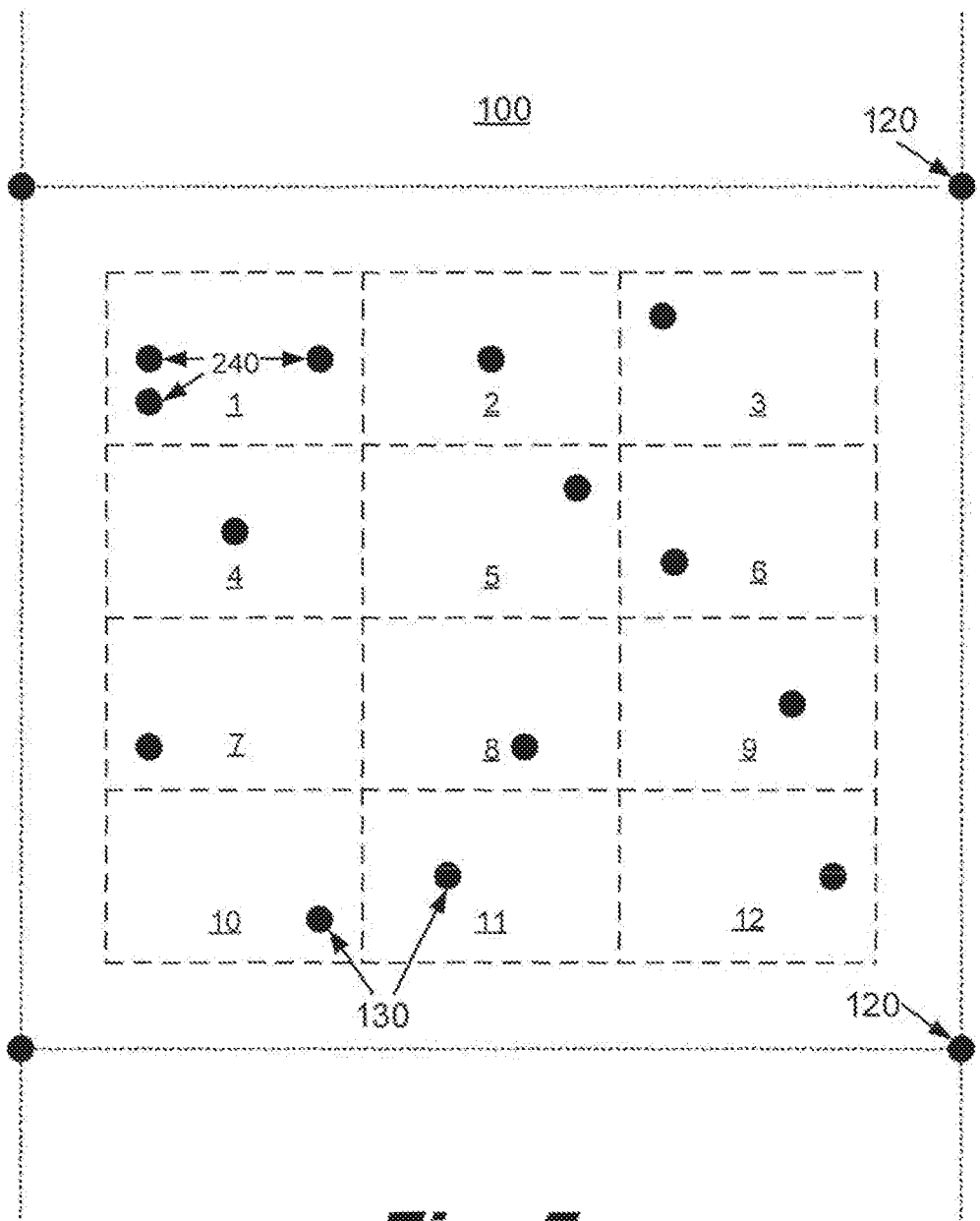
FIG. 5 shows a surface with embedded information according to an example consistent with the present specification.

FIG. 5 shows a surface (100) with embedded information according to an example consistent with the present specification. FIG. 5 shows a data page of a data page where the data page has different numbers of data grids (1-12) in X and Y. The data grids (1-12) also have different sizes in X and Y. The orientation marks (240) are in a data grid (1) located in the upper left corner instead of the center of the array of data grids (1-12). The other data grids (2-12) Include information marks (123) containing information based on their respective positions in their data grids (2-12).

Within the principles described by this specification, a vast number of variations exist. The examples described are examples, and are not intended to limit the scope, applicability, and/or construction of the claims in any way.

What is claimed is:

1. A surface with embedded information comprising:
a plurality of visually detectable marks, wherein the visually detectable marks comprise:
a first group of grid marks forming a grid and
a second group of information marks encoding information based on positions of marks of the second group of information marks relative to a data page, wherein grid marks are less than 45% of the visually detectable marks on the surface.

2. The surface of claim 1, wherein the grid marks are less than 20% of the visually detectable marks on the surface.

3. The surface of claim 1, wherein the marks have a mean spacing of not less than 350 microns and not greater than 3500 microns.

4. The surface of claim 1, wherein the visually detectable marks encode at an Areal Density Low-Occlusion Factor of at least 2.75 bits/mm$^2$/% mark-occlusion with an pattern of circular marks of no less than 100 μm diameter or marks having a per mark area no smaller than a per mark area of a 100 μm diameter circular mark.

5. The surface of claim 4, wherein the marks cover no more than 8% of the surface.

6. The surface of claim 4, wherein the marks cover no more than 4% of the surface.

7. The surface of claim 1, wherein each information mark encodes a state among at least 8 possible states in a data grid.

8. The surface of claim 1, wherein each mark of the plurality of visually detectable marks is a member of group one or group two but not both.

9. A surface with embedded information comprising:
a plurality of visually detectable marks, wherein the visually detectable marks comprise:
a first group of grid marks forming a grid;
a second group of information marks encoding information based on positions of the information marks in the second group of information marks relative to the data page; and
a third group of orientation marks in each data page, wherein the third group of orientation marks provide orientation information for the grid.

10. The surface of claim 9, wherein each data page of the data page comprises an array of data grids, each data grid containing an information mark and/or an orientation mark.

11. The surface of claim 10, wherein each data page contains a single data grid containing orientation marks and the remaining data grids of each data page each contain an information mark.

12. The surface of claim 11, wherein each data grid containing orientation marks from the third group of orientation marks occupy a same array position in each data page of the data page.

13. A surface with embedded information comprising:
a plurality of visually detectable marks, wherein the visually detectable marks comprise:
a first group of composite marks, the first group of composite marks forming a data page and the first group of composite marks indicating an orientation direction for the visually detectable marks on the surface, and
a second group of information marks,
wherein each data page contains an array of data grids, one data grid in each data page contains a composite mark, other data grids in each data page contain an information mark, and the information marks encode information based on the position of the information mark within the respective data grid containing the information mark.

14. The surface of claim 13, wherein border data grids in adjacent data pages share a common edge.

15. The surface of claim 13, wherein the first group of composite marks includes a subgroup of three composite marks in a data grid of each data page, the subgroups of three composite marks having a same relative positions and orientations in each data page on the surface.

16. The surface of claim 1, wherein each of the marks of the second group encodes three or more bits.

17. The surface of claim 1, wherein each position in a data page for a mark of the second group corresponds to a letter in an alphabet or a single-digit number.

18. The surface of claim 1, wherein the grid and information marks cover no more than 4.5% of the surface.

19. The surface of claim 1, further comprising a third group of orientation marks in each data page, wherein the third group of orientation marks provides orientation information for the grid.

20. The surface of claim 9, wherein each of the marks of the second group encodes three or more bits.

* * * * *